United States Patent [19]
Yoshino

[11] Patent Number: 5,560,623
[45] Date of Patent: Oct. 1, 1996

[54] METAL GASKET

[75] Inventor: Nobuo Yoshino, Kumagaya, Japan

[73] Assignee: Kabushiki Kaisha Ket and Ket, Saitama, Japan

[21] Appl. No.: 411,060

[22] Filed: Mar. 27, 1995

Related U.S. Application Data

[63] Continuation of Ser. No. 987,950, Dec. 11, 1992, abandoned, which is a continuation-in-part of Ser. No. 836,201, filed as PCT/JP91/00452, Apr. 4, 1991, abandoned.

[30] Foreign Application Priority Data

Apr. 4, 1990 [JP] Japan ................ 2-91027
Aug. 7, 1990 [JP] Japan ................ 2-209710

[51] Int. Cl.$^6$ ........................ F16J 15/08
[52] U.S. Cl. ........................ 277/235 B
[58] Field of Search ............ 277/207 R, 209, 277/211, 231, 235 B, 235 R, 236

[56] References Cited

U.S. PATENT DOCUMENTS

| | | | |
|---|---|---|---|
| 4,711,456 | 12/1987 | Udagawa | 277/235 B |
| 4,721,315 | 1/1988 | Ueta | 277/235 B |
| 4,815,750 | 3/1989 | Yoshino | 277/235 B |
| 4,861,046 | 8/1989 | Udagawa | 277/235 B |
| 4,896,891 | 1/1990 | Udagawa | 277/235 B |
| 4,898,396 | 2/1990 | Udagawa | 277/234 X |
| 4,915,398 | 4/1990 | Kitagawa | 277/235 B X |

FOREIGN PATENT DOCUMENTS

| | | | |
|---|---|---|---|
| 0255251 | 11/1986 | Japan | 277/235 B |
| 0261755 | 11/1987 | Japan | 277/235 B |
| 0191569 | 7/1992 | Japan | 277/235 B |
| 0248070 | 9/1992 | Japan | 277/235 B |
| 0347065 | 12/1992 | Japan | 277/235 B |
| 0697854 | 9/1953 | United Kingdom | 277/235 B |

*Primary Examiner*—William A. Cuchlinski, Jr.
*Assistant Examiner*—John L. Beres
*Attorney, Agent, or Firm*—Keck, Mahin & Cate

[57] ABSTRACT

The present invention relates to a metal gasket for installation into a gap between a cylinder head and a cylinder block of a multi-cylinder engine by bolt fasteners. The gasket includes a base plate and a supplementary plate. The base plate has a plurality of combustion chamber openings, a plane plate portion surrounding each of the openings, and a convex cross-sectional shaped bead surrounding the plane plate portion and providing an inner and an outer sealing line on a concave side of the bead on the side of the opening and on the far side of the opening, respectively. The supplementary plate is overlapped with the concave side of the base plate and extended from a periphery of each opening to an area of the bead passing through the plane flange portion and the inner sealing line. The supplementary plate, however, is not extended to the outer sealing line. In this way, the supplementary plate forms a portion increased in thickness. Only the inner sealing line of two sealing lines overlaps with the portion which is increased in thickness having relatively wide width. The inner sealing line provides a good sealing function to seal the gap around the combustion chamber opening where the gap clearance is larger than that in the portion near the bolt fastening portion and, therefore, provides good durability during the engine operation.

6 Claims, 10 Drawing Sheets

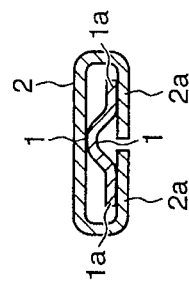
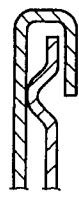
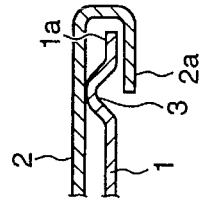
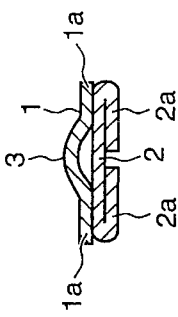
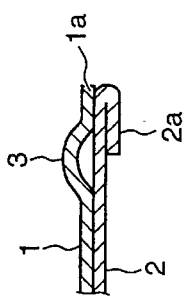
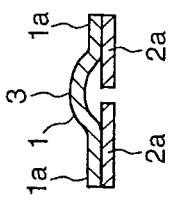
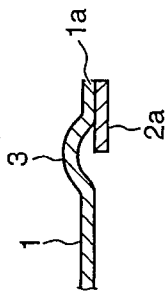

ics://

METAL GASKET

This is a continuation of application Ser. No. 07/989,950, filed Dec. 11, 1992, abandoned, which is a continuation-in-part of U.S. patent application Ser. No. 07/836,201, filed as PCT/JP91/00452, Apr. 4, 1991, now abandoned.

FIELD OF THE INVENTION

The present invention relates to a metal gasket for sealing a gap between a cylinder head and a cylinder block of an internal combustion engine, and more particularly, to a metal gasket for coping with a phenomenon of opening the gap between the cylinder head and cylinder block in accordance with a distance from a bolt fastening part to a part around a combustion chamber opening gradually and for sealing a whole gap between the cylinder head and the cylinder block with a uniform sealing pressure at the time of securing a cylinder head and a cylinder block in multi-cylinder engines.

BACKGROUND OF THE INVENTION

When a cylinder head and a cylinder block of an internal combustion engine are secured in the prior art, as shown in FIG. 34, after situating a metal gasket formed with a bead 53 for surrounding a combustion chamber opening 42 between the gap of a cylinder head 45 and a cylinder block 46, it is bolted with a bolt 40 at a predetermined bolt fastening part 41. At this time, the bead 53 is elastically deformed by a fastening force of the bolt 40, and the elastically restoring force and the elastic restoration at the time of the elastic deformation form an elastic sealing line between the gap between the cylinder head 45 and the cylinder block 46 and thereby sealing the gap.

However, although the cylinder head 45 is bolted at each fastening part 41 with the uniform fastening force as shown in FIG. 33, the whole gap of the cylinder head 45 and the cylinder block 46 can not be secured uniformly and such gap changes variously according to the relation with the position of the bolt fastening part 41.

This is because the larger the distance from the fastening part 41 is, the lower the fastening force of the bolt 40 becomes. As a result of that, as the distance from the bolt fastening part, 41 becomes larger, the gap between the cylinder head 45 and the cylinder block 46 becomes larger, thereby deteriorating the sealing pressure of the bead.

In particular, in the multi-cylinder engines arranging a plurality of the combustion chamber openings 42 as shown in FIG. 33, such gap clearance between the cylinder head 45 and the cylinder block 46 gradually increases in order of a gap portion extending from the bolt fastening part 41 to a part around the combustion chamber opening 42 (A–A'–A" cross-sectional part of FIG. 33), a gap portion between the bolt fastening parts 41 and 41 (B–B' cross-sectional part of FIG. 33), and a gap portion between the combustion chamber openings 42 and 42 (C–C' cross-sectional part of FIG. 33). This leads to considerable blowing-off of burned gas between the adjacent combustion chamber openings.

Further, the surfaces of gasket between the cylinder head 45 and the cylinder block 46 are beaten due to the repetition of the increase and decrease of the gap clearance by the explosion gas pressure in the combustion chamber opening 42. As a result, the gasket is easily apt to cause failure deformation not only between the bolt fastening parts 41 and 41 but also the bead near the bolt fastening part 41, thereby deteriorating the sealing pressure of the gap between the cylinder head 45 and the cylinder block 46. This results in serious problems such as an enhanced blowing-off of the gas and loosening of the fastening bolts 40.

Accordingly, in order to solve the above mentioned problems, in the conventional metal gasket, a supplementary plate 52 is provided against a base plate 51 in which a bead 53 is formed, as shown in FIG. 34.

The reference is made to the explanation about the conventional metal gasket based on FIGS. 35 (a) to (c). FIG. 35 (a) corresponds to a A–A'–A" cross-sectional part of FIG. 33 and is a cross-sectional view of a part around the combustion chamber opening of the metal gasket in the gap from the bolt fastening part 41 to the part around the combustion chamber opening 42. Hereinafter, similarly, FIG. 35 (b) corresponds to a B–B' cross-sectional part of FIG. 33 and is a cross-sectional view of a part around the combustion chamber opening of the metal gasket between the bolt fastening parts 41 and 41, and FIG. 35 (c) corresponds to a C–C' cross-sectional part of FIG. 33 and is a cross-sectional view of a part of the metal gasket between the combustion chamber openings 42 and 42.

In the FIGS. 35 (a) to (c), the reference numeral 51 is a base plate for forming a bead 53 in which the bead having an arc and convex shape in the cross-section is formed, and 52 is a supplementary plate. This supplementary plate 52 is provided on whole surface of the base plate 51 in the concave side of the bead 53 and is folded to the convex side of the bead 53 at an inner periphery end of a plane plate portion 51a to overlap to the surface of the plane plate portion 51a, thereby forming a portion 52a increased in thickness. Further, in FIG. 35 (c), when the distance between the combustion chamber openings 42 and 42 is narrow and it is not possible to form an independent bead 53 relative to each combustion chamber opening 42, two beads are connected to each other and merged in one bead 53 at the center point between the combustion chamber openings 42 and 42. Accordingly, the plane plate portions 51a and 51a are provided at both sides of the bead 53 and this results in the construction of overlapping the portions 52a and 52a increased in thickness under the plane plate portions 51a and 51a.

In the above mentioned construction, by controlling bead heights H51, H52, and H53 and the bead widths W51, W52, and W53 in accordance with the gap clearance between the cylinder head 45 and the cylinder block 46, the gap between the cylinder head 45 and the cylinder block 46 can be compensated. Further, by providing a portion 52a increased in thickness around the combustion chamber opening 42, it is possible to compensate the gap between the cylinder head 45 and the cylinder block 46 around the combustion chamber opening 42 in which the gap clearance, at the time of fastening the bolt, is large.

However, according to the above mentioned metal gasket, since the supplementary plate 52 is provided on whole surface of the base plate 51 in the concave side of the bead 53 and is folded at the side the combustion chamber opening 42 to overlap with the plane plate portion 51a, two inner and outer sealing lines 51f and 51j formed in the concave side of the bead 53 are overlapped by the supplymentary plate 52 and each of the increased amounts in thickness at the sealing lines 51f and 51j by the supplymentary plate 52 becomes equal. On the other hand, as for the bead heights H51, H52, and H53 projecting to the convex side of the bead 53, the deflective height is reduced for the thickness S51 of each portion 52a increased in thickness, thereby causing the problem of deteriorating the sealing pressure of the bead. In other words, the portion 52a increased in thickness provided to compensate the gap whose clearance is larger around the combustion chamber opening 42 than the other gap portion and causes the deterioration of the sealing pressure of the bead 53 and the sealing function by the bead.

Further, between the combustion chamber openings 42 having a largest gap clearance between the cylinder head 45 and the cylinder block 46, as shown in FIG. 35 (c), not only the deflective height of the bead 53 is reduced by the thickness S51 of both portions 52a and 52a increased in thickness but also both portions 52a and 52a increased in thickness tend to be in the state of floating between the gap, because these portions 52a and 52a locate in the convex side of the bead 53. That is, the more the bead height H53 of the bead 53 increases, the more both portions 52a and 52a are beaten by the repetition of the increase and decrease of the gap clearance due to the explosion gas pressure, thereby causing the breakage of both portions 52a and 52a and deteriorating the sealing function.

Even though both portions 52a and 52a increased in thickness are formed to be thicker than other parts of the portion 52a in FIGS. 35 (a) or (b), corresponding to the large gap clearance between the combustion chamber openings 42 and 42, such gap clearance changes in accordance with the variations in dimensions by each engine and the order of fastening the bolts even in the same type of engine. Accordingly, it may produce the reverse effect on the sealing function by thickening the portion 52a increased in thickness and it is also very difficult to process the portion 52a having a variable thickness.

Further, if failure deformation occurs in the bead 53 by beating due to the explosion gas pressure, the fastening bolt 40 may come loose. This causes considerable deterioration of the engine function.

SUMMARY OF THE INVENTION

The present invention is to solve the above mentioned problems according to the conventional art. One object of the present invention is to provide a metal gasket for securing a sealing function of all of the gap between the cylinder head and the cylinder block by making a sealing pressure at the gap portion between the combustion chamber openings very strong at the time of fastening a bolt, which is not sufficient in the conventional art.

Another other object of the present invention is to provide a metal gasket for making good use of the sealing function of a bead without any reduction of the surface pressure of the bead by a portion increased in thickness so as to compensate the largest gap clearance between the cylinder head and the cylinder block around the combustion chamber opening.

Another object of the present invention is to provide a metal gasket for compensating the gap between the cylinder head and the cylinder block, which opens gradually from the bolt fastening part to the part around the combustion chamber opening, with a uniform sealing pressure regardless of such gap clearance variation.

Further, the other object of the present invention is to provide an improved metal gasket, wherein it is not easy to produce the failure deformation of the bead even on when the cylinder block is beaten by the cylinder head due to the explosion gas pressure. It is possible to secure a durability of the bead without any loosening of the fastening bolt.

BRIEF DESCRIPTION OF THE DRAWINGS

FIG. 1 is a view for showing the cross-sectional state around the combustion chamber opening of the metal gasket according to the present invention.

FIG. 5(a) shows tracks of inner sealing lines if formed in the concave side of the bead and FIG. 5(b) shows a track of an outer sealing line 1j.

FIGS. 6 to 10 are the cross-sectional views around the combustion chamber opening of various examples of metal gaskets, according to the present invention, having a symmetric convex bead as shown in FIG. 1. In FIGS. 6 to 10, each (a) corresponds to the A–A'–A" cross-sectional part of FIG. 2, each (b) corresponds to the B–B' cross-sectional part of FIG. 2, and each (c) corresponds to the C–C' cross-sectional part thereof.

FIG. 13(a) shows the inner sealing lines If and FIG. 13(b) shows the outer sealing line 1j.

FIG. 15(a) shows the inner sealing lines if and FIG. 15(b) shows the outer sealing line 1j.

DETAILED DESCRIPTION OF THE INVENTION

Hereinafter, the reference is made to the explanation of the embodiments of the present invention based on the drawings.

Figure 1A:
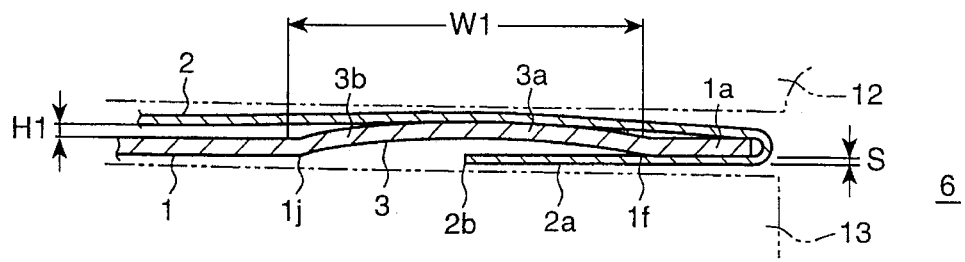
FIG. 1(a) is a cross-sectional view around the combustion chamber opening along with the A–A'–A" line in FIG. 2.
Figure 1B:
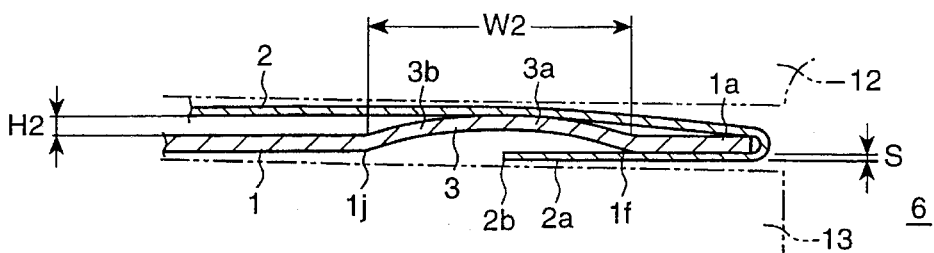
FIG. 1(b) is a cross-sectional view around the combustion chamber opening along with the B–B' line.
Figure 1C:
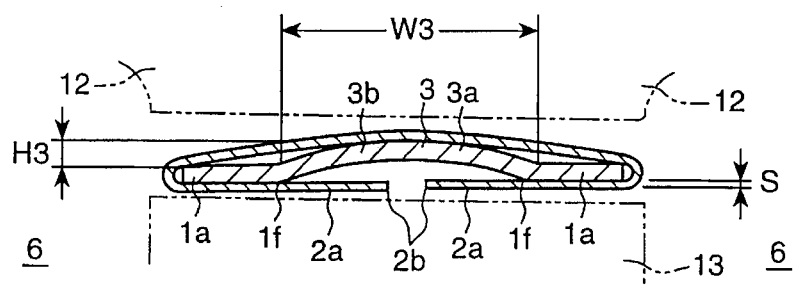
FIG. 1(c) is a cross-sectional view between the combustion chamber openings along the C–C' line.
Figure 2:
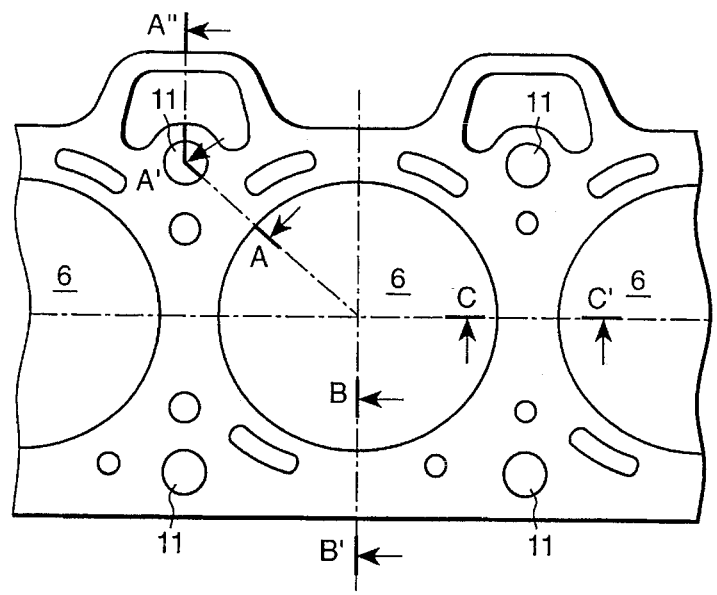
FIG. 2 is a partial plane view of an intersurface forming the gap between the cylinder head and the cylinder block of the multi-cylinder engines.
Figure 3:
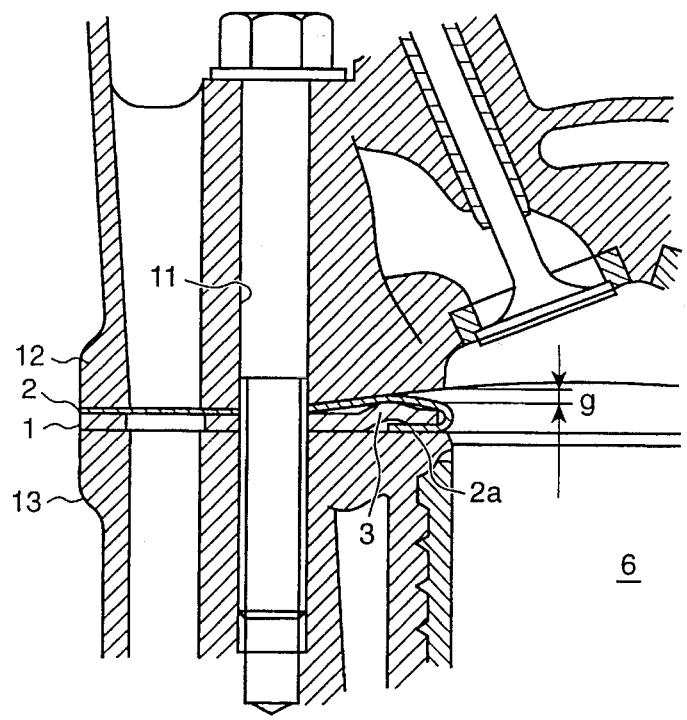
FIG. 3 is a cross-sectional view for showing the state of installing the metal gasket according to the present, invention into the gap between the cylinder head and the cylinder block corresponding to the A–A'–A" cross-sectional portion of FIG. 2 and bolt fastening.

FIGS. 1(a) to (c) are illustrations for showing the cross-sectional state around the same combustion chamber opening 6 of, for example, FIG. 2. FIG. 1(a) is a cross-sectional view around the combustion chamber opening along with the A–A'–A" line of FIG. 2, FIG. 1(b) is a cross-sectional view around the combustion chamber opening along with the B–B' line, and FIG. 1(c) is a cross-sectional view between the combustion chamber openings along the C–C' line.

The reference numeral 1 indicates a base plate for forming a bead, comprising an elastic metal plate, and a plane plate portion 1a is formed at the inner periphery end around the combustion chamber opening 6 in this base plate 1 for predetermined width. The plane plate portion 1a is surrounded by a bead 3 whose cross-sectional shape is an arc and convex. Further, 2 is a supplementary plate, made of a soft metal plate, and such supplementary plate 2 is provided on the whole surface of the base plate 1 in the convex side of the bead 3 and is folded to the concave side of the bead 3 at the inner periphery end of the plane plate portion 1a, thereby forming the portion 2a increased in thickness. The outer periphery end 2b of the portion 2a increased in thickness extends to about the center position of the bead 3.

In each bead 3 of FIGS. 1(a) to (c), the bead width corresponding to the A–A'–A" cross-sectional part of FIG. 2 is designated as W1 and the bead height is H1. The bead width corresponding to the B–B' cross-sectional part of FIG. 2 is designated as W2 and the bead height is H2. The and the bead width corresponding to the C–C' cross-sectional part of FIG. 2 is as W3 and the bead height is H3. As one gets farther from the bolt fastening part 11, the bead width of the bead 3 around the combustion chamber opening is reduced gradually, that is, W1>W2>W3 and the bead height is increased gradually, that is, H1<H2<H3. Such controlling of bead height and bead width makes the bead sealing pressure strong and more uniform regardless of the variation of the gap clearance between the cylinder head 12 and the cylinder block 13 which becomes wider in order of the A–A'–A" cross-sectional part of FIG. 2, the B–B' cross-sectional part, and the C–C' cross-sectional part, thereby realizing the sealing by the bead 3.

Figure 4:
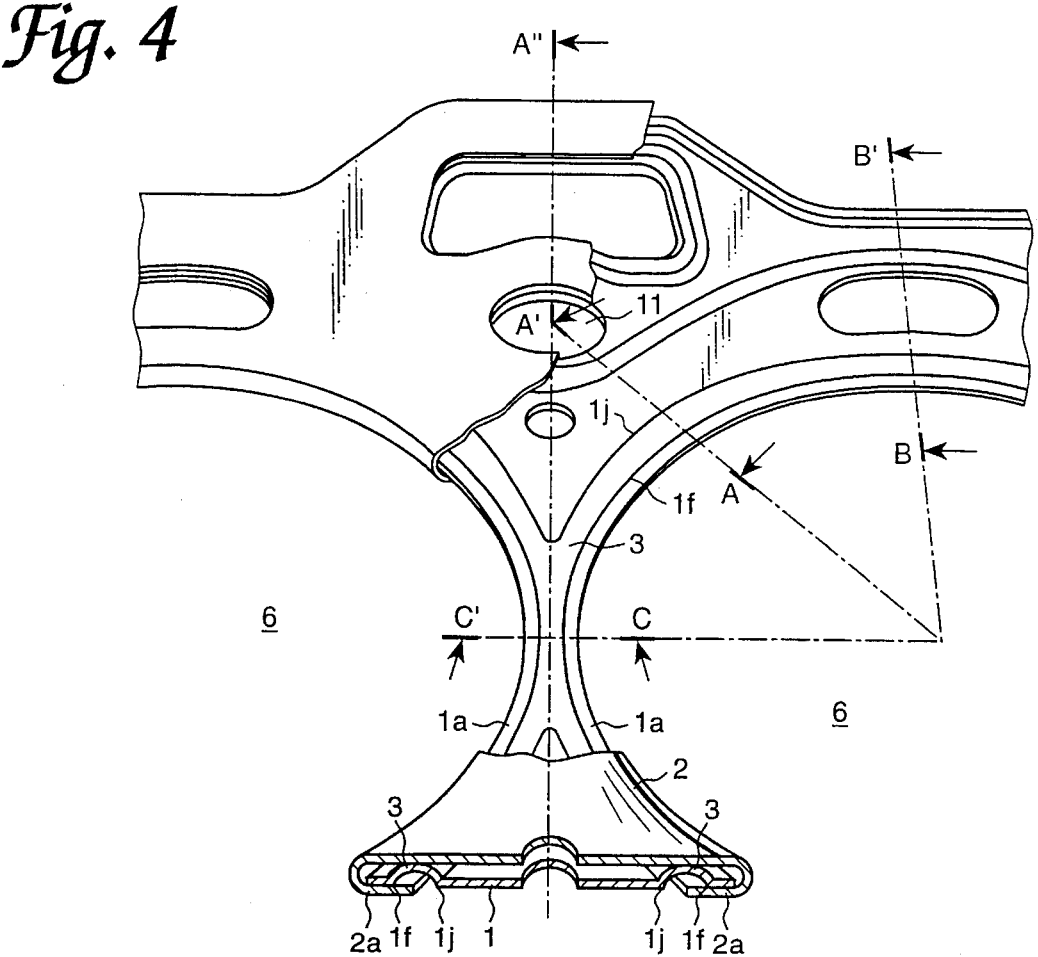
FIG. 4 is a partial perspective view of the part between the combustion chamber openings of the metal gasket according to the present invention as shown in FIG. 1 for the multi-cylinder engines in which the distance between the adjacent combustion chamber openings is relatively narrow. The A–A'–A" line, B–B' line, and C–C' line correspond to the A–A'–A" line, B–B' line, and C–C' line of FIG. 2, respectively.

FIG. 1(c) shows a state of forming the bead 3 in the case the distance between the adjacent combustion chamber openings 6 and 6 is relatively narrow as shown in FIG. 4. The beads 3 and 3 are formed around each adjacent combustion chamber opening 6 and the beads 3 and 3 are connected and merged in one bead at the point where each combustion chamber opening 6 is close to each other.

Namely, as shown in FIG. 1(c), the plane plate portions 1a and 1a are formed at both sides of the bead 3, and the supplementary plate 2 covers the convex side of the bead 3 and is folded to the concave side of the bead 3 at the periphery ends of both plane plate portions 1a and 1a so as to overlap these plane plate portions 1a and 1a, thereby forming the portions 2a and 2a increased in thickness.

Figure 5A:
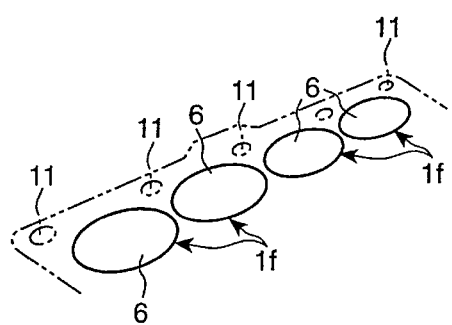
FIGS. 5(a) and (b) are illustrations for showing tracks of sealing lines in the concave side of the bead in the case in which two adjacent beads are merged at the center position between the combustion chamber openings because the distance between the combustion chamber openings of the multi-cylinder engines is narrow as shown in FIG. 4.
Figure 5B:
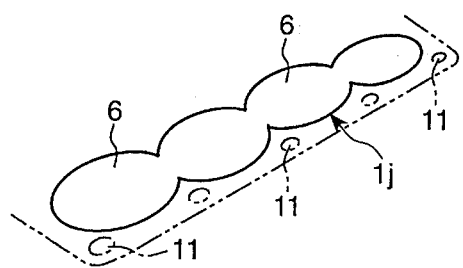

Two bottom portions in the concave side of the bead 3 form an inner sealing line if and an outer sealing line ij, for surrounding the combustion chamber opening 6 and these draw tracks of the sealing lines of FIG. 5 in the case of the multi-cylinder engines in which the distance between the combustion chamber openings 6 is relatively narrow. Namely, FIG. 5(a) shows tracks of the inner sealing lines 1f, wherein each of them is independent around each combustion chamber opening 6. FIG. 5(b) shows the track of the outer sealing line ij, wherein it surrounds the periphery of each combustion chamber opening 6 and draws the connected track when the bead 3 is merged at each point between the combustion chamber openings 6. Accordingly, as shown in FIG. 1(c), the inner sealing lines if and If are formed at the both bottom portions of the bead 3 between the combustion chamber openings 6.

As for the above mentioned construction, in FIGS. 1(a) and (b), since the portion 2a increased in thickness, in the concave side of the bead 3, is overlapped under the plane plate portion 1a near the combustion chamber opening 6, only the inner sealing line if passes through in the state of coming in contact with the upper surface of the portion 2a increased in thickness.

According to the above mentioned metal gasket, in the A–A'–A" cross-sectional portion or the B–B' cross-sectional portion of FIG. 2, as shown in FIGS. 1(a) and (b), only the inner sealing line If is overlapped by the portion 2a increased in thickness and the outer sealing line 1j is not overlapped by the same. Therefore, near the bolt fastening part 11, when the bead 3 is flattened on fastening by the bolt, the total thickness of the metal gasket is thicker in the side of inner sealing line 1f (the engine combustion chamber opening side)than in the side of the outer sealing line 1j and these thickness differences at both side of the bead 3 causes good sealing functions near the engine combustion chamber opening 6 (wedge effect). When the bead 3 located in the A–A'–A" and B–B' cross-sectional portions is flattened on fastening the cylinder head 12 and the cylinder block 13 by bolts, the gap clearance in the C–C' cross-sectional portion is larger than other portions. But good sealing pressure at this portion can be attained by the bead 3 having higher height H3 and narrower width W3 at this portion as shown in FIG. 1(c). So the uniform sealing pressure can be obtained all around the combustion chamber opening 6.

And at this bead flattened state, in the A–A'–A" or the B–B' cross-sectional portion, in the bead side 3b, the total thickness of the metal gasket is less for the thickness S. Therefore, even in the case the plastic deformation occurs at the inflection point of the base plate 1 at the inner sealing line 1f at the bead, flattened state as the gap clearance between the cylinder head and the cylinder block at the outer sealing line 1j is approximately equal to the total thickness of the gasket at the sealing line 1f and is wider than the thickness of the base plate 1, the spring force by the bead side 3a in the side of the outer sealing line 1j remains and it functions to give sealing pressure when the gap clearance increases due to the gas pressure.

Figure 35A:
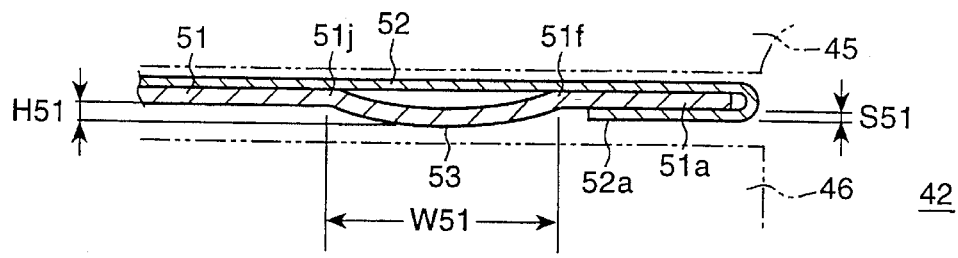
Figure 35B:
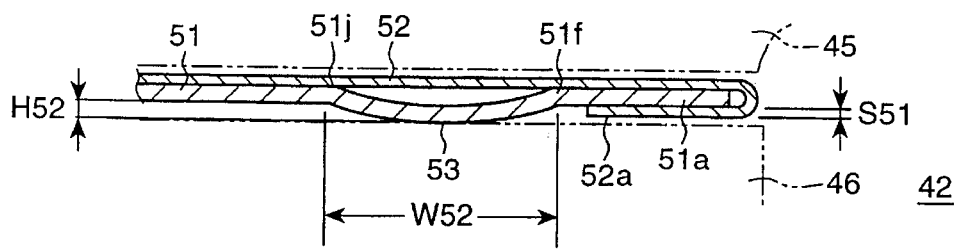

Additionally, as the outer periphery end 2b of the portion 2a increased in thickness extends to about the center portion of the bead 3, the portion 2a is wide in the width to give wider contact area to the cylinder block compared with the conventional art shown in FIGS. 35(a) and (b) and it prevents the defective deformation of the contact surface of the cylinder block by the excessive sealing pressure and also overcomes small nicks, flaws or other unevenness on the contact surface of the cylinder block. Furthermore, the inflection point of the base plate 1 at the inner sealing line if between the bead 3 and the plane plate portion 1a is completely ridden on the portion 2a, and therefore, there is no increase in stress concentration at this point by providing this portion 2a, when the bead 3 is flattened.

Figure 35C:
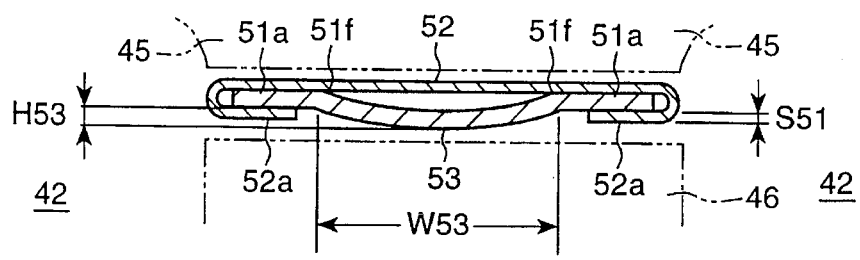

Further, in the C–C' cross-sectional portion of FIG. 2 (c), both of the inner sealing lines if and if are overlapped by the portions 2a and 2a increased in thickness. Accordingly, wider contact area of the portion 2a and 2a to the cylinder block surface of relatively narrow width can be provided compared with the conventional art shown in FIG. 35(c), and it gives preferable sealing function and good durability against the phenomenon of the repetition of the increase and decrease of the gap clearance due to the gas pressure during the engine operation.

As mentioned above, as for the bead 3 of the metal gasket cited as one embodiment of the present invention, both bead sides 3a and 3b have the common symmetric arc shape to give the bead 3 of symmetric convex shape. As examples of the present invention using such symmetric convex shaped bead, there are variations as shown in FIGS. 6 to 10. In these FIGS. 6 to 10, each (a) corresponds to the A–A'–A" cross-sectional portion, each (b) to the B–B' cross-sectional portion, and each (c) to the C–C' cross-sectional portion of FIG. 2, respectively.

The metal gasket as shown in FIGS. 6(a) to (c) has a similar construction to that of FIG. 1.

As for the metal gasket as shown in FIGS. 7(a) to (c), the supplementary plate 2 is provided under the base plate 1 in the concave side of the bead 3 and the supplementary plate 2 is folded at the plane plate portion 1a near the combustion chamber opening, thereby forming the portion 2a increased in thickness.

As for the metal gasket as shown in FIGS. 8(a) to (c), a ring shape supplementary plate 2 is provided under the plane plate portion 1a near the combustion chamber opening in the concave side of the bead 3, thereby forming the portion 2a increased in thickness.

Figure 9C:
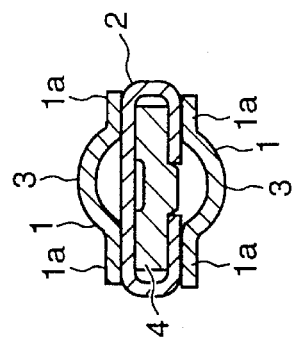
Figure 9B:
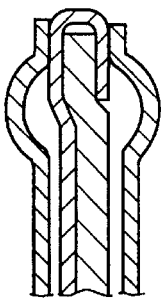
Figure 9A:
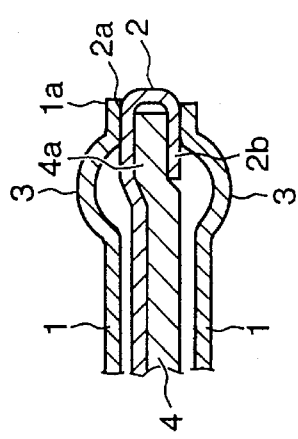

As for the metal gasket as shown in FIGS. 9(a) to (c), a step 4a is formed by bending the portion near the combustion chamber opening of an intermediate plate 4 and the supplementary plate 2 is provided along with the intermediate plate 4, the inner periphery end 2b of the supplementary plate 2 is folded to the concave side of the step 4a of the intermediate plate 4, and the lower side of the intermediate plate 4 is made planar, thereby forming the portion 2a increased in thickness in the convex side of the step 4a of the intermediate plate 4. Further, two base plates 1 and 1 in which the bead 3 is formed are provided on both surfaces of the intermediate plate 4.

Figure 10C:
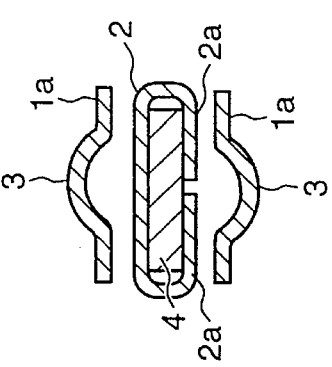
Figure 10B:
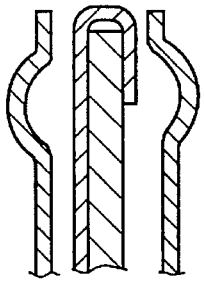
Figure 10A:
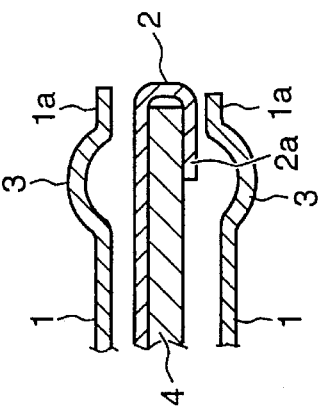

As for the metal gasket as shown in FIG. 10(a) to (c), the portion near the combustion chamber opening of the supplementary plate 2 is folded on the intermediate plate 4 having no step 4a in FIGS. 9(a) to (c), thereby forming the portion 2a increased in thickness.

All metal gaskets as shown in FIGS. 6 to 10 have the construction of overlapping the portion 2a increased in thickness to the plane plate portion 1a in the side of the combustion chamber opening 6 and in the concave side of the bead 3 formed in the base plate 1 and all metal gaskets have the same effect as that shown in FIG. 1. And particularly, examples, shown in FIGS. 9 and 10 having two base plates can receive wider height change and are preferable for use in engines wherein the gap clearance changes widely by the combustion gas pressure.

Figure 11:
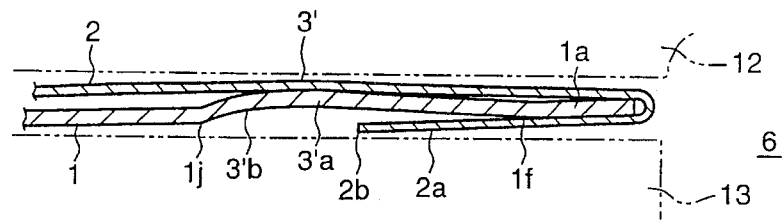
FIG. 11 is a cross-sectional view around the combustion chamber opening of the metal gasket according to another embodiment of the present invention in which a symmetric convex bead of the metal gasket as shown in FIG. 1 is changed to the non-symmetric convex bead.

Further, the other embodiment is shown in FIG. 11. As for the metal gasket as shown in FIG. 11, a bead side 3'b in the side of the outer sealing line 1j has an arc shape and a bead side 3a in the side of the inner sealing line 1f is an arc shape of larger radius than the bead side 3'b or approximately linear (hereinafter, both shapes are expressed as "approximately linear"), and both sides 3'a and 3'b form a bead 3' of non-symmetric convex shape, in the A–A'–A" or the B–B' cross-sectional portion of FIG. 2, wherein the metal gaskets as shown in FIGS. 1 and 6 to 10 have the bead of the symmetric convex shape. However, in the C–C' cross-sectional portion of FIG. 2, when the distance between the combustion chamber openings 6 and 6 is narrow and one bead 3' passes through therebetween, the bead 3' becomes symmetric shape similar to the bead 3 as shown in FIG. 1(c). The height and the width of the bead 3' corresponding to the A–A'–A", the B–B' and the C–C' cross-sectional portion is gradually increase and decrease, respectively, as getting farther from the bolt fastening part, similar to the metal gasket in FIG. 1.

Figure 12:
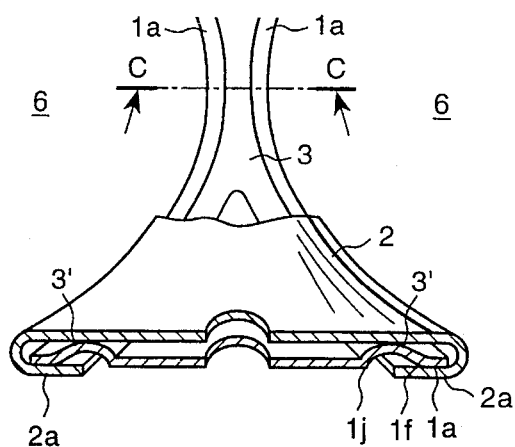
FIG. 12 is a partial perspective view of the part between the combustion chamber openings of the metal gasket as shown in FIG. 11 for multi-cylinder engines in which the distance between the adjacent combustion chamber openings is relatively narrow.

According to the above construction, in the A–A'–A" and the B–B' cross-sectional portions of FIG. 2, a spring constant of the bead side 3a in the side of the portion 2a increased in thickness is smaller than that of the bead side 3'b, without the decrease of the bead height, and the spring load in the bead side 3a at the time of bolt fastening is reduced. Therefore bolts are easily fastened with relatively smaller fastening torque than those in the case of the metal gasket having a bead of symmetric convex shape cross-section. Therefore the predetermined bolt fastening load can be applied to the whole surface of the metal gasket to give good sealing contact between the gasket and the cylinder block. Other functions and effects than those by forming the bead 3' to have non-symmetric convex shape mentioned above are same as the metal gasket having the symmetric convex shaped bead 3 and have been already explained with regard to FIG. 1. The example of such metal gasket is shown in FIG. 12. This FIG. 12 corresponds to FIG. 4 and shows the cross-sectional state around the combustion chamber openings 6 and 6.

Figure 13A:
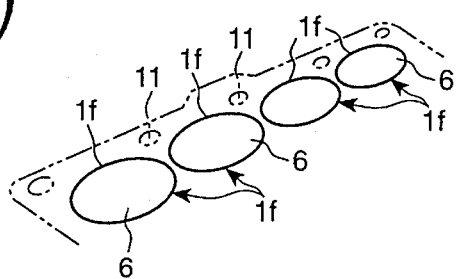
FIGS. 13(a) and (b) are illustrations for showing the tracks of sealing lines formed in the concave side of the bead in the case of using the metal gasket of FIG. 11 in a multi-cylinder engine having a narrow distance between each combustion chamber opening.
Figure 13B:
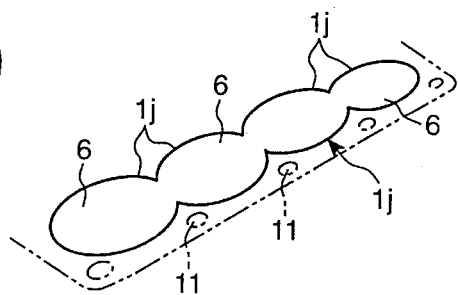

FIGS. 13(a) and (b) correspond to FIGS. 5(a) and (b), and FIG. 13(a) shows the independent tracks of the inner sealing lines if around each combustion chamber opening and FIG. 13(b) shows the track of the outer sealing line 1j which surrounds each combustion chamber opening and draws the connected track when the bead 3' is merged at each point between combustion chamber openings. These FIGS. 12 and 13 show the case where the distance between the adjacent combustion chamber openings 6 is narrow. On the other hand, as shown in FIG. 14, in the case where the distance between the combustion chamber openings is wide, for compensating the wide distance between the combustion chamber openings 6, a compensating plate 5 having approximately the same thickness as the portion 2a increased in thickness can be inserted between the outer periphery ends 2b of the portion 2a increased in thickness between the combustion chamber openings 6.

Figure 14:
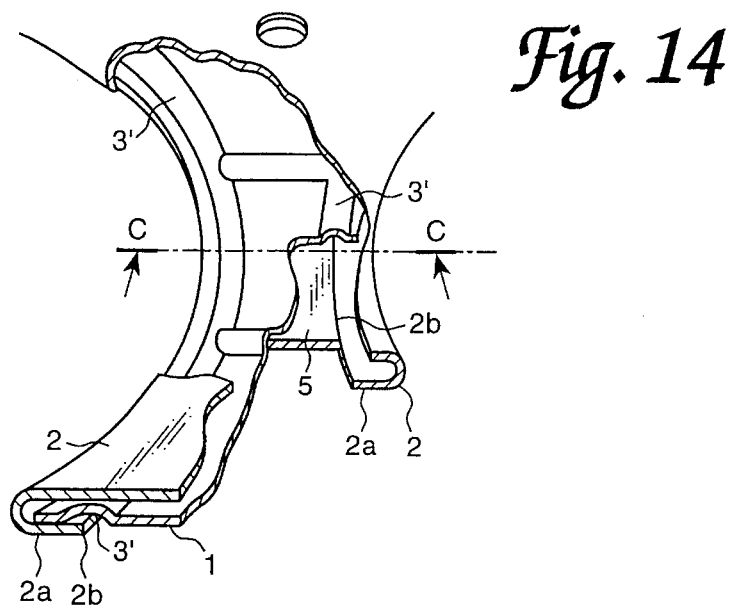
FIG. 14 is a partial perspective view of the part between the combustion chamber openings of the metal gasket as shown in FIG. 11 for a multi-cylinder engine in which the distance between the adjacent combustion chamber openings is relatively wide.
Figure 15A:
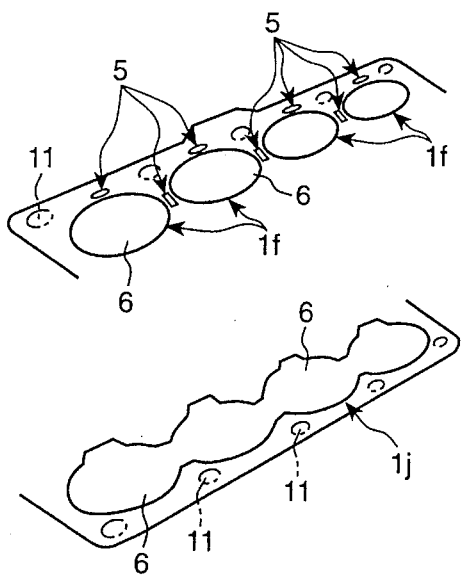
FIGS. 15(a) and (b) are illustrations for showing the tracks of sealing lines formed in the concave side of the bead in the case of using the metal gasket of FIG.14 in the multi-cylinder engine having relatively wide distance between each combustion chamber opening.
Figure 15B:
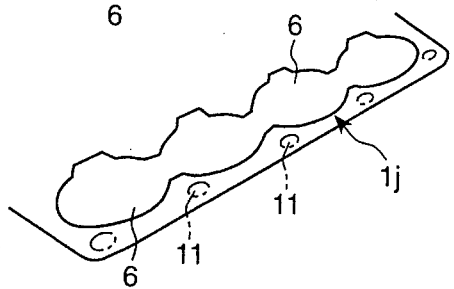
Figure 16:
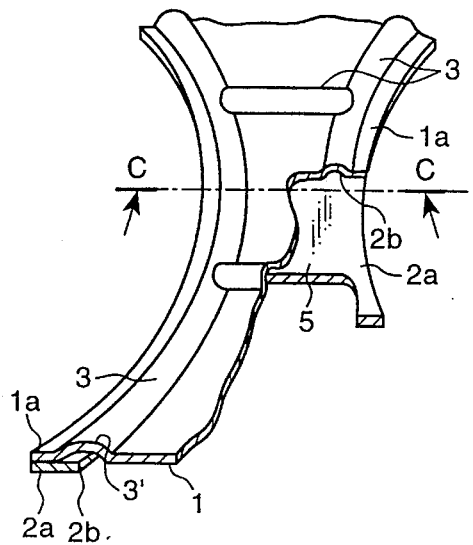
FIG. 16 is a partial perspective view of the part between the combustion chamber openings of a modified example of the metal gasket as shown in FIG. 14.

FIG. 16 is an another partial perspective view around the C–C' cross-sectional portion as shown in FIG. 14. The metal gasket as shown in FIG. 16 is a modified example of the metal gasket of FIG. 11, wherein the portions 2a and 2a increased in thickness are provided by the ring shaped supplementary plate under the plane plate portions 1a and 1a in the concave side of the bead 3. Also in this case, the compensating plate 5 can be inserted between the outer periphery ends 2b and 2b of the portion 2a and 2a increased in thickness.

Further, various examples of the metal gasket having the above mentioned non-symmetric convex shaped bead 3' are shown in FIGS. 17 to 32. Each of these drawings shows the cross-sectional state around the combustion chamber opening.

Figure 17:
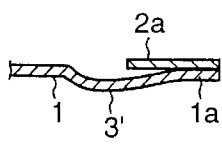
FIGS. 17 to 32 are the cross-sectional views around the combustion chamber opening of various examples of metal gaskets according to the present invention in which the non-symmetric convex bead as shown in FIG. 11 is formed.

As for the metal gasket as shown in FIG. 17, the portion 2a increased in thickness by the ring shaped supplementary plate is placed on the base plate 1 in the concave of side the bead 3'.

Figure 18:
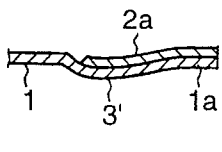

The metal gasket of FIG. 18 is similar to that of FIG. 17, wherein the portion 2a increased in thickness is provided along with the inner side of the concave shape of the bead 3'.

Figure 19:
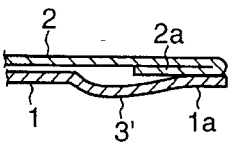

In the metal gasket of FIG. 19, the supplementary plate 2 is provided on the base plate in the concave side of the bead 3' and is folded in the side of the combustion chamber opening to overlap, thereby forming the portion 2a increased in thickness.

Figure 20:
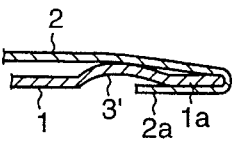

The metal gasket of FIG. 20 is similar to that of FIG. 11.

Figure 21:
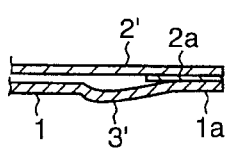

As for the metal gasket of FIG. 21, a second supplementary plate 2' is provided on the concave side of the bead 3' and the portion 2a increased in thickness is overlapped between the second supplementary plate 2 and the base plate 1 in the side of the plane plate portion 1a.

Figure 22:
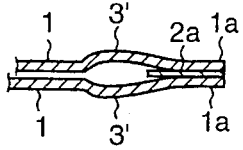

The metal gasket of FIG. 22 has two base plates 1 and 1 and has the shape in which one base plate is positioned on the gasket shown in FIG. 17 so as to sandwich the portion 2a increased in thickness between both base plates 1 and 1.

Figure 23:
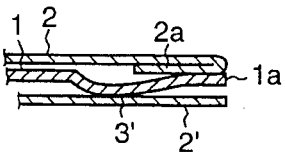

As for the metal gasket of FIG. 23, the second plane supplementary plate 2' is further overlapped under the base plate 1 in the metal gasket of FIG. 19.

Figure 24:
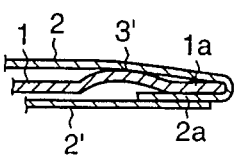

As for the metal gasket of FIG. 24, the second plane supplementary plate 2' is further overlapped under the base plate 1 of the metal gasket of FIG. 20.

Figure 25:
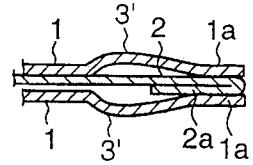

In the metal gasket of FIG. 25, one of two base plates 1 and 1 having the same shape of bead 3' is overlapped on the supplementary plate 2 of the metal gasket of FIG. 19 so as to sandwich the supplementary plate 2 between two base plates 1 and 1.

Figure 26:
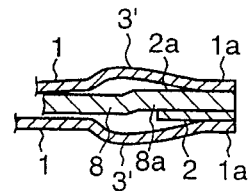

In the metal gasket of FIG. 26, a step 8a is formed by bending the side of the combustion chamber opening of the intermediate plate 8 to the upper side, the supplementary plate 2 is inserted into the concave side of the step 8a, and after the portion 2a increased in thickness is formed in the convex side of the step 8a, the base plates 1 and 1 having the bead 3' are positioned symmetrically to each surface side of the intermediate plate 8.

Figure 27:
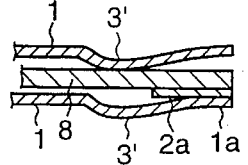

In the metal gasket of FIG. 27, the portion 2a increased in thickness is provided under the intermediate plate 8 in the side of the combustion chamber opening, one base plate 1 having the bead 3' is provided under the intermediate plate 8 and the portion 2a increased in thickness, and another base plate 1 having the bead 3' is provided on the reverse side of the intermediate plate 8 so that the convex side of the bead 3' of another base plate 1 comes in contact with the side surface of the intermediate plate 8.

Figure 28:
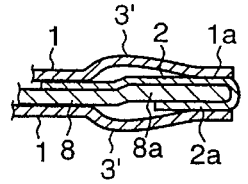

The metal gasket of FIG. 28 is similar to that of FIG. 26 but the intermediate plate 8 has no step 8a in FIG. 26 and the supplementary plate 2 is folded along with the edge in the side of the combustion chamber opening of the intermediate plate 8.

Figure 29:
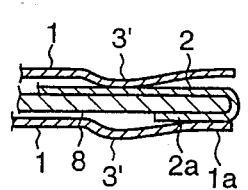

The metal gasket of FIG. 29 is similar to that of FIG. 27 but the supplementary plate is folded along with the edge in the side of the combustion chamber opening of the intermediate plate 8.

Figure 30:
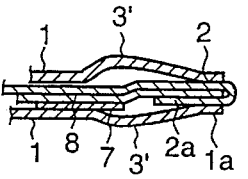

As for the metal gasket of FIG. 30, the thin intermediate plate 8 is bent to the upper side in the side of the combustion chamber opening and the supplementary plate 2 is provided on the upper side of the intermediate plate 8. Further, the supplementary plate 2 is folded to overlap under the intermediate plate 8 to form the portion 2a increased in thickness and an auxiliary plate 7 of a thickness thinner than the portion 2a is provided under the intermediate plate 8.

Figure 31:
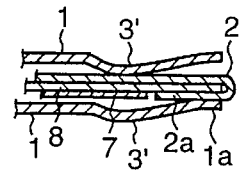

The metal gasket of FIG. 31 is similar to that of FIG. 29 but the intermediate plate 8 is thinner and an auxiliary plate 7 is positioned under the intermediate plate 8.

Figure 32:
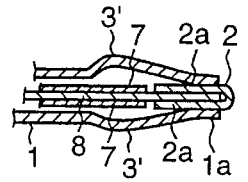
Figure 33:
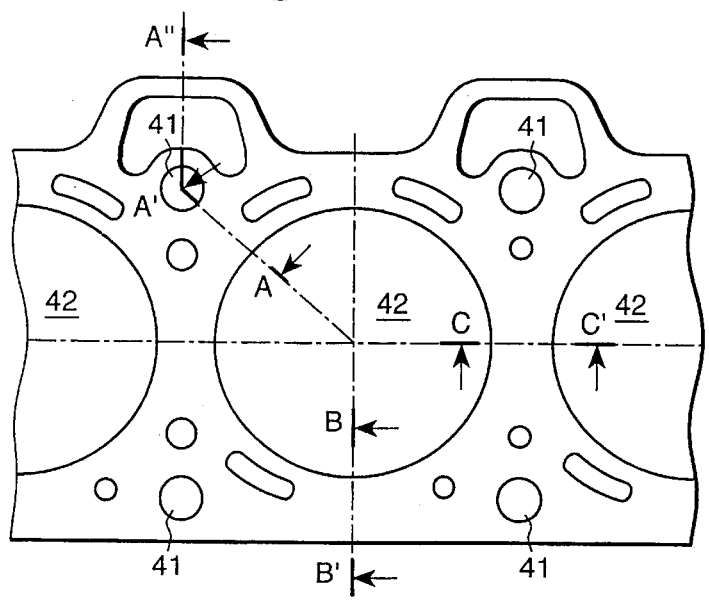
Figure 34:
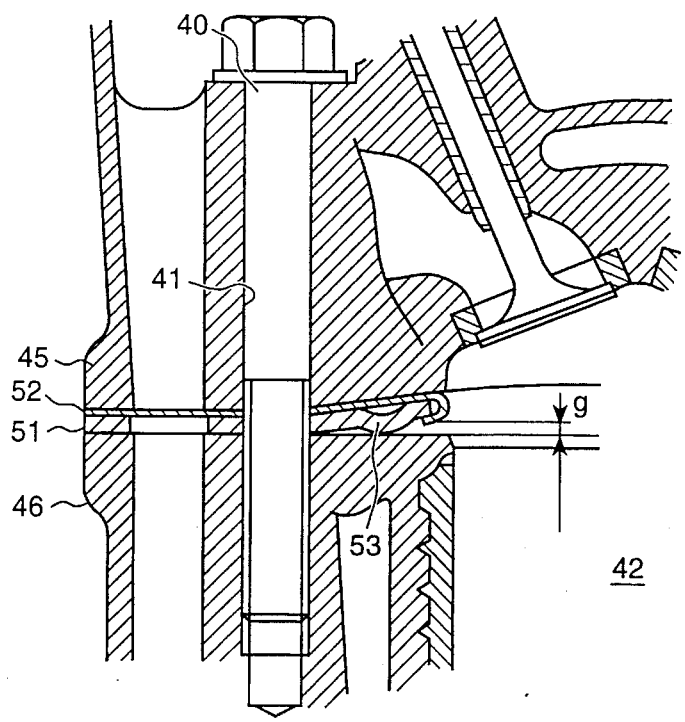

In the metal gasket of FIG. 32, the supplementary plate 2 is folded and overlapped to the upper and the lower surface of the plane and thin intermediate plate 8 to form the portions 2a and 2a increased in thickness and the auxiliary plates 7 and 7 having a smaller thickness than the portions 2a are provided in the upper and lower sides of the intermediate plate 8.

Every metal gasket as shown in FIGS. 17 to 32 has the construction of overlapping the portion 2a increased in thickness to the plane plate portion 1a in the side of the combustion chamber opening 6 and in the concave side of the non-symmetric bead 3' formed in the base plate 1 and every metal gaskets have the same effect as that shown in FIG. 11. And particularly, examples shown in FIGS. 22, 25 to 32 having two base plates can receive wider height change and are preferable to use engines wherein the gap clearance changes widely by the combustion gas pressure.

As for the method of connecting the components of the above mentioned metal gaskets, spot welding, seam welding, laser welding, adhesion, etc. can be applied besides a folding and calking method. Further, when a heat-resistant rubber such as nitrile rubber and fluorine-contained rubber is coated to both surfaces of the gasket facing the cylinder head and the cylinder block, and preferably also to other surfaces of the gasket components, it is possible to adsorb process marks and flaws on the intersurfaces of the cylinder head and the block and to improve the sealing function therebetween.

What is claimed is:

1. A metal gasket for installation into gap between a cylinder head and a cylinder block of a multi-cylinder engine by bolt fastening comprising:

a base plate having a planar plate portion surrounding each of the plurality of combustion chamber openings and a cross-sectionally arc-shaped bead surrounding said planar plate portion, said cross-sectionally arc-shaped bead having a convex side and a concave side, opposite to said convex side, said bead defining an inner sealing line adjacent to one of said opening and an outer sealing line on an opposite side of said bead from said one of said openings, each of said inner and outer sealing lines defined adjacent to said concave side of said bead; and a supplementary plate overlapping and in surface contact with said planar plate portion on the concave side and extending from an inner position, adjacent to a periphery of said one of said openings, to an in-between position, between said inner sealing line and said outer sealing line, to form a portion of the metal gasket of increased thickness formed by the planar plate portion in surface contact with and completely riding on the supplementary plate on the concave side of the bead between said inner position and said inner sealing line.

2. A metal gasket as defined by claim 1, wherein a cross-sectional shape of said bead is non-symmetric at least in a portion of said base plate near a bolt fastening portion, said non-symmetric cross-sectional shape is formed by two bead sides, one of said bead sides being approximately linear and sloping in shape, the other of said bead sides being arc shaped in cross-sectional the approximately linear and sloping shaped bead side overlapping said portion of the metal gasket which is increased in thickness, a spring constant of one bead side on said portion of the tail gasket which is increased in thickness being smaller than that of the other of said bead sides.

3. A metal gasket as defined by claim 1, wherein two adjacent beads are connected to each other and merged together between adjacent combustion chamber openings and two inner sealing lines for said adjacent combustion chamber openings are formed by said two adjacent beads which are merged together and overlap to form two portions which are increased in thickness.

4. A metal gasket as defined by claim 1, and further comprising a compensating plate provided on the concave side between two adjacent portions of aid metal gasket which are increased in thickness the thickness of said compensating plate being approximately the same as that of said adjacent portions.

5. A metal gasket as defined by claim 1, wherein said bead has a height which gradually increases and a width which gradually decreases as a distance between said bead and a bolt fastening portion increases.

6. A metal gasket as defined by claim 1, wherein said inner sealing line is independent for each of said combustion chamber openings and said outer sealing line is continuously formed so as to surround a plurality of said openings.

* * * * *